United States Patent [19]

Mizuguchi et al.

[11] 4,205,152
[45] May 27, 1980

[54] THERMOSETTING RESIN AND ITS PRODUCTION

[75] Inventors: Ryuzo Mizuguchi, Tondabayashi; Atsushi Takahashi, Kyoto; Shin-ichi Ishikura, Takatsuki; Akimitsu Uenaka, Suita, all of Japan

[73] Assignee: Nippon Paint Co., Ltd., Osaka, Japan

[21] Appl. No.: 859,102

[22] Filed: Dec. 9, 1977

[30] Foreign Application Priority Data

Dec. 9, 1976 [JP] Japan .................................. 51-148373
Dec. 9, 1976 [JP] Japan .................................. 51-148374
Dec. 9, 1976 [JP] Japan .................................. 51-148375

[51] Int. Cl.$^2$ ............... C08F 20/06; C08F 220/06; C08F 28/00; C08J 3/74
[52] U.S. Cl. .................. 526/265; 260/29.40 A; 260/29.6 WB; 260/29.6 TA; 260/29.7 NR; 260/29.7 H; 260/33.2 R; 526/211; 526/287; 526/292; 526/304; 526/423; 260/27.6 RW
[58] Field of Search ............... 526/287, 292, 304, 923, 526/265; 260/29.6 RW, 29.6 WB, 29.6 TA, 29.7 NR, 29.7 H, 29.6 NR

[56] References Cited

U.S. PATENT DOCUMENTS

| | | | |
|---|---|---|---|
| 2,843,573 | 7/1958 | Melamed | 526/292 |
| 4,012,353 | 3/1977 | Chasin et al. | 526/304 |
| 4,075,183 | 2/1978 | Kawakami et al. | 526/287 |
| 4,129,545 | 12/1978 | Sunamori et al. | 526/304 |

OTHER PUBLICATIONS

Chem. Abs., vol. 80, 1974, 28611(a), Thermosetting Coating Containing Copolymer of Methylol Deriv. of Carboxylic Acid Amides & Esters.

*Primary Examiner*—Joseph L. Schofer
*Assistant Examiner*—Herbert J. Lilling
*Attorney, Agent, or Firm*—Wenderoth, Lind & Ponack

[57] ABSTRACT

A thermosetting resin which is a linear copolymer having a molecular weight of 10,000 to 1,000,000 and a glass transition point of −30° to +80° C., obtained by polymerizing in an aqueous medium a monomer mixture comprising (1) 0.1 to 50% by weight of at least one polymerizable monomer having an ampho-ionic structure, selected from the group consisting of (i) compounds representable by the formula:

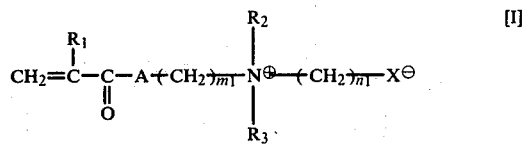

wherein $R_1$ is a hydrogen atom or a methyl group, $R_2$ and $R_3$ are each, the same or different, a $C_1$-$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by either one of the formulae:

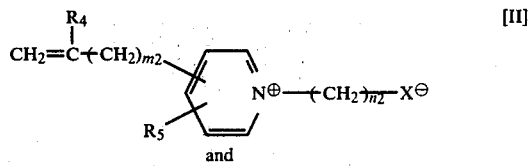

and

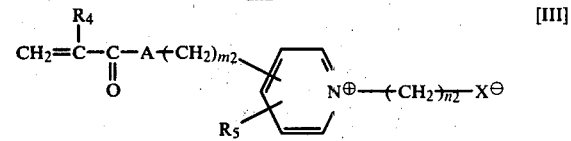

wherein $R_4$ is a hydrogen atom or a methyl group, $R_5$ is a hydrogen atom or a $C_1$-$C_3$ alkyl group, $m_2$ is an integer of 0 to 6 and $n_2$ is an integer of 1 to 6, and A and $X^-$ are as defined above, (2) 0.5 to 70% by weight of at least one polymerizable monomer containing a reactive amide group, representable by the formula:

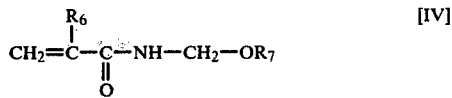

wherein $R_6$ is a hydrogen atom or a methyl group and $R_7$ is a hydrogen atom or a $C_1$-$C_4$ alkyl group and (3) 1 to 99.4% by weight of at least one of other polymerizable monomers.

16 Claims, No Drawings

THERMOSETTING RESIN AND ITS PRODUCTION

The present invention relates to novel thermosetting resins, a process for preparation thereof and cross-linking agents and thermosetting paint compositions mainly comprising the same.

Various kinds of thermosetting resins of self-bridging type have been already developed. They are considered to be particularly suitable for uses of resins for paints, materials for molding of plastics and the like. In these resins, however, hardening reaction is apt to take place simultaneously at the polymerization step in the production process, and because of occurrence of gelation in some cases, preparation of stable resins becomes difficult. Even if a stable resin can be prepared, a long duration of time or a high temperature is sometimes required in the hardening reaction.

Besides, in a thermosetting resin to be used in the form of an aqueous solution or an aqueous colloidal dispersion, relatively large amounts of COOH groups and OH groups are introduced for the purpose of giving a hydrophilic property thereto. These hydrophilic functional groups can not be eliminated effectively at the time of coating film formation to cause various disadvantages such as deterioration in water resistance and solvent resistance of the formed coating film and appearance of delustering phenomenon at baking.

On the other hand, thermosetting paint compositions have been hitherto utilized in an extremely wide range in the field of industrial paints, because they are converted into a three dimentional polymeric substance by a chemical reaction, when heat energy is given after their application to a substrate to be painted, to afford a coating film having a high durability.

Under these circumstances, lowering of the temperature required for thermal setting and shortening of the time for setting contribute greatly to economy in energy resources and besides enlarge the range of the kinds of substrates to be coated, woods, paper and plastics being thus included, in addition to metals. Since the greater part of all of the volatile component in an aqueous paint composition is water, in usual, it is possible to prevent air pollution and to avoid loss of oil resources.

In conventional aqueous thermosetting paint composition, however, the use of a resin having a large molecular weight in emulsion form can afford a high durability, but the appearance of the coating film is not good. By the use of a resin having a relatively small molecular weight in the form of aqueous solution of colloidal aqueous dispersion for the purpose of obtaining an excellent appearance of the coating film, to the contrary, the water resistance and solvent resistance of the coating film are deteriorated and the workability is insufficient, thick application being not possible and flowing out or hanging down being caused.

The first object of the present invention is to provide a novel thermosetting resin which is freed from the said problems in the production process mentioned above, having specific crosslinkable functional groups not reacting each other under polymerization conditions, and can afford a hardened coating film with excellent quality. The second object of the invention is to provide a novel thermosetting resin which is freed from the said problems in the production process and in the quality of coating film as above, having specific crosslinkable functional groups not reacting each other during the polymerization reaction and affording a hardened coating film with excellent water resistance by a thermal hardening reaction at a relatively low temperature in a short time even when relatively large amounts of hydrophilic functional groups are contained, and also to a process for preparation of such thermosetting resin. The third object of the invention is to provide an aqueous thermosetting paint composition which can afford a coating film being excellent in durability, water resistance and solvent resistance and having a good appearance at a relatively low temperature and in a short time with a good workability in application.

As the result of the extensive study for attaining such objects, it has been confirmed firstly that an excellent hardening property can be obtained by a combination of an ampho-ionic group and a reactive amide group as the said crosslinkable functional groups, the ampho-ionic group exhibiting a catalytic action to the reactive amide group. On the basis of this fact, it has been found that, by copolymerization of polymerizable monomers affording such crosslinkable functional group and another monomer copolymerizable therewith in a designed mixing proportion in an aqueous medium, the objective thermosetting resin can be obtained in the form of a dispersion in the aqueous medium. The thus obtained thermosetting resin itself is a linear copolymer, the desired crosslinking reaction being able to be attained, and can be advantageously utilized, as such or in combination with an aminoplast resin, for the use of paints. As to the resin quality, this thermosetting resin is proved to have a molecular weight of 10,000 to 1,000,000 and a glass transition point of $-30°$ to $+80°$ C.

Secondly, it has been confirmed that, by combination of an ampho-ionic group and a reactive amide group as the said crosslinkable functional group, the ampho-ionic group reacts effectively with the reactive amide group, or the ampho-ionic group shows a catalytic action accelerating the self condensation of the reactive amide group. It has been found, on the basis of this fact that by solution polymerization of a polymerizable monomer having an ampho-ionic structure, a polymerizable monomer having a reactive amide group, a polymerizable monomer having a carboxyl group for obtaining a water solubility and another polymerizable monomer in a specific mixing proportion in a hydrophilic organic solvent, the objective resin can be obtained in the form of a solution in the hydrophilic organic solvent. It has been also found that, when the thus obtained resin is used as a crosslinking agent for a conventional active hydrogen-containing resin, it can afford a shaped product or coating film having a three-dimensional structure at a relatively low temperature in a short time, because the ampho-ionic group shows, in the presence of a functional group containing an active hydrogen atom (especially hydroxyl group), an extremely excellent catalytic activity in the condensation reaction of the reactive amide group with the active hydrogen-containing functional group. It has been further found that a paint composition comprising this resin as the main ingredient can afford a coating film having a smooth surface and showing a good water resistance. This resin is a linear copolymer which is proved to have a number average molecular weight of 1,000 to 50,000 and a glass transition point of $-20°$ to $80°$ C.

Thirdly, it has been found that the objective thermosetting paint composition can be obtained by combining a resin emulsion in which the said first thermosetting resin is dispersed in an aqueous medium with an aqueous solution of the said second thermosetting resin.

According to the present invention which has been completed on the basis of these findings, there are provided firstly a thermosetting resin which is a linear copolymer having a molecular weight (number average molecular weight; hereinafter referred to as "$\overline{M}n$") of 10,000 to 1,000,000 and a glass transition point (hereinafter referred to as "Tg") of $-30°$ to $+80°$ C., obtained by polymerizing in an aqueous medium (1) 0.1 to 50% by weight of at least one polymerizable monomer having an ampho-ionic structure (hereinafter referred to as "ampho-ionic monomer"), selected from the group consisting of (i) compounds representable by the formula:

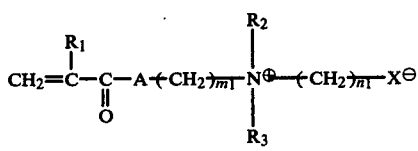

wherein $R_1$ is a hydrogen atom or a methyl group, $R_2$ and $R_3$ are each, the same or different, a $C_1$-$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by either one of the fromulae:

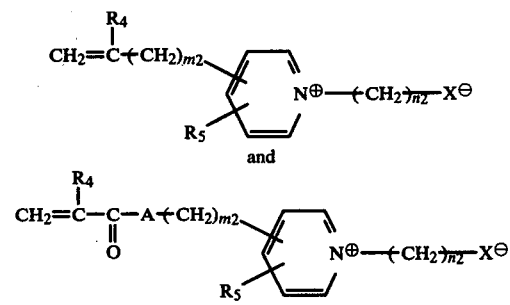

wherein $R_4$ is a hydrogen atom or a methyl group, $R_5$ is a hydrogen atom or a $C_1$-$C_3$ alkyl group, $m_2$ is an integer of 0 to 6 and $n_2$ is an integer of 1 to 6, and A and $X^-$ are as defined above, (2) 0.5 to 70% by weight of at least one polymerizable monomer containing a reactive amide group (hereinafter referred to as "amide monomer"), representable by the formula:

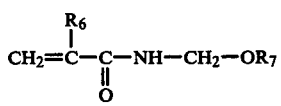

wherein $R_6$ is a hydrogen atom or a methyl group and $R_7$ is a hydrogen atom or a $C_1$-$C_4$ alkyl group and (3) 1 to 99.4% by weight of at least one of other polymerizable monomers, a process for preparing a thermosetting resin which comprises polymerizing (1) 0.1 to 50% by weight of at least one ampho-ionic monomer selected from the group consisting of (i) compounds representable by the formula [I] and (ii) compounds presentable by either one of the formulae [II] and [III], (2) 0.5 to 70% by weight of at least one amide monomer representable by the formula [IV] and (3) 1 to 99.4% by weight of at least one of other polymerizable monomers in an aqueous medium in the presence of a polymerization initiator to obtain a linear copolymer having a $\overline{M}n$ value of 10,000 to 1,000,000 and a Tg value of $-30°$ to $+80°$ C. in the form of a dispersion in the aqueous medium, a thermosetting paint composition which comprises as the main ingredient a thermosetting resin which is a linear copolymer having a $\overline{M}n$ value of 10,000 to 1,000,000 and a Tg value of $-30°$ to $+80°$ C., obtained by polymerizing in an aqueous medium (1) 0.1 to 50% by weight of at least one ampho-ionic monomer selected from the group consisting of (i) compounds representable by the formula [I] and (ii) compounds representable by either one of the formulae [II] and [III], 0.5 to 70% by weight of at least one amide monomer representable by the formula [IV] and (3) 1 to 99.4% by weigtht of at least one of other polymerizable monomers and a thermosetting paint composition which comprises as the main ingredient a thermosetting resin which is a linear copolymer having a $\overline{M}n$ value of 10,000 to 1,000,000 and a Tg value of $-30°$ to $+80°$ C., obtained by polymerizing in an aqueous medium (1) 0.1 to 50% by weight of at least one ampho-ionic monomer selected from the group consisting of (i) compounds representable by the formula [I] and (ii) compounds representable by either one of the formulae [II] and [III], (2) 0.5 to 70% by weight of at least one amide monomer representable by the formula [IV] and (3) 1 to 99.4% by weight of at least one of other polymerizable monomers and an aminoplast resin.

There are also provided secondly a thermosetting resin which is a linear copolymer having a $\overline{M}n$ value of 1,000 to 50,000 and a Tg value of $-20°$ to $+80°$ C., obtained by polymerizing in a hydrophilic organic solvent (1) 0.1 to 50% by weight of at least one ampho-ionic monomer selected from the group consisting of (i) compounds representable by the formula [I] and (ii) compounds representable by either one of the formulae [II] and [III], (2) 0.5 to 70% by weight of at least one amide monomer representable by the formula [IV], (3) 1 to 50% by weight of at least one polymerizable monomer containing a carboxyl group (hereinafter referred to as "carboxylic monomer") and (4) 1 to 98.4% by weight of at least one of other polymerizable monomers, a process for preparing thermosetting resins which comprises solution polymerizing (1) 0.1 to 50% by weight of at least one ampho-ionic monomer selected from the group consisting of (i) compounds representable by the formula [I] and (ii) compounds representable by either one of the formulae [II] and [III], (2) 0.5 to 70% by weight of at least one amide monomer representable by the formula [IV], (3) 1 to 50% by weight of at least one carboxylic monomer and (4) 1 to 50% by weight of at least one of other polymerizable monomers in a hydrophilic organic solvent to obtain a linear copolymer having a $\overline{M}n$ value of 1,000 to 50,000 and a Tg value of $-20°$ to $+80°$ C. in the form of a solution in the hydrophilic organic solvent, a crosslinking agent which comprises the said thermosetting resin as the main ingredient and a thermosetting paint composition which comprises the said thermosetting resin as the main ingredient.

There is also provided thirdly a thermosetting paint composition which comprises (a) a resin emulsion obtained by polymerization of an ampho-ionic monomer, an amide monomer and another polymerizable monomer being copolymerized therewith and (b) an aqueous resin solution obtained by polymerization of an ampho-ionic monomer, an amide monomer, a carboxylic monomer and another polymerizable monomer being copolymerizable therewith.

The thermosetting resin, the crosslinking agent, and the thermosetting paint composition according to the invention will be hereinafter explained in detail.

First thermosetting resin and thermosetting paint composition:

The ampho-ionic monomer (i) represented by the formula [I] is prepared by reacting an aminoalkyl ester of an appropriate acrylic or methacrylic acid with sultone or lactone. It may be also prepared by the addition reaction of an acrylate or methacrylate of an appropriate aminoalkyl compound or an acrylamide or methacrylamide of an appropriate aminoalkyl compound with alkylene oxide and $SO_2$ or $SO_3$. Specific examples of the compound (i) are 3-dimethyl(methacryloylethyl)ammonium propanesulfonate, 3-diethyl(methacryloylethyl)ammonium propanesulfonate, 3-dimethyl(acryloylethyl)ammonium propanesulfonate, 3-diethyl(acryloylethyl)ammonium propanesulfonate, 3-dimethyl(methacryloylethyl)ammonium ethanecarboxylate, 3-diethyl(methacryloylethyl)ammonium ethanecarboxylate, 3-dimethyl(acryloylethyl)ammonium ethanecarboxylate, 3-diethyl(acryloylethyl)ammonium ethanecarboxylate, etc.

The ampho-ionic monomer (ii) represented by either one of the formulae [II] and [III] is prepared by the reaction of an appropriate vinyl pyridine derivative with sultone or lactone. Specific examples are 4-vinylpyridinium propanesulfonate, 2-vinylpyridinium propanesulfonate, 4-vinylpyridinium ethanecarboxylate, 2-vinylpyridinium ethanecarboxylate, etc. These ampho-ionic monomers (i) and (ii) may be employed solely or in combination. They may be subjected to the polymerization as such or in the form of an aqueous solution of suitable concentration.

As the amide monomer represented by the formula [IV], there may be exemplified N-methylolacrylamide, N-methylolmethacrylamide, N-n-butoxymethylacrylamide, N-n-butoxymethylmethacrylamide, N-t-butoxymethylacrylamide, N-t-butoxymethylmethacrylamide, etc. One or more of these monomers may be used as such or, if necessary, in the form of a solution with an appropriate concentration.

The said other polymerizable monomers of the invention may be usual monomers containing an ethylenic double bond. Specific examples are carboxylic monomers (e.g. acrylic acid, methacrylic acid, crotonic acid and itaconic acid, maleic acid, fumaric acid and their monoesters), hydroxyl group-containing polymerizable monomers (e.g. 2-hydroxyethyl acrylate, hydroxypropyl acrylate, 2-hydroxyethyl methacrylate, hydroxypropyl methacrylate, allyl alcohol, metaallyl alcohol; hereinafter referred to as "hydroxyl monomer"), acrylates and methacrylates having a $C_1$-$C_{12}$ alcohol residue (e.g. methyl acrylate, methyl methacrylate, n-butyl acrylate), polymerizable nitriles (e.g. acrylonitrile, methacrylonitrile), polymerizable aromatic compounds (e.g. styrene, α-methylstyrene, vinyltoluene, t-butylstyrene), α-olefinic compounds (e.g. ethylene, propylene), vinyl compounds (vinyl acetate, vinyl propionate), diene compounds (e.g. butadiene, isoprene), etc. These compounds may be used solely or in combination.

Among the above mentioned other polymerizable monomers, the use of the ones having an active hydrogen-containing functional group such as the carboxylic monomer and the hydroxyl monomer (hereinafter referred to as "active hydrogen-monomer") is particularly advantageous in that the ampho-ionic group in the ampho-ionic monomer serves as an extremely excellent catalyst for the addition reaction of the reactive amide group in the amide monomer and the active hydrogen-containing functional group (carboxyl group, hydroxyl group) to accelerate the bridging reaction of the thermosetting resin under more favorable conditions.

The thermosetting resin of the invention is composed of the ampho-ionic monomer, the amide monomer and the other polymerizable monomer. The mixing proportion of these monomers may be appropriately varied depending on the hardening property of the thermosetting resin and the quality of the hardened coating film. In usual, the amount of the ampho-ionic monomer is 0.1 to 50% (by weight), preferably 2 to 40%, to the total amount of the monomers. When the amount is less than 0.1%, a desired hardening reaction can not be attained satisfactorily. Even when it exceeds 50%, on the other hand, the effect to the hardening reaction is not increased, but the water resistance of the hardened coating film is rather deteriorated. The proportion of the amount of the amide monomer is 0.5 to 70%, preferably 1 to 60%. When it is less than 0.5%, a sufficiently hardened state can not be obtained. When it is larger than 70%, the hardened coating film obtained possesses a sufficient hardenss, but is becomes too fragile and the range of its use is limited. The said other polymerizable monomer is used in a proportion of 1 to 99.4%. In case of using the active hydrogen-monomer, it may be employed, as a part of the said other polymerizable monomer, in a proportion of 0.5 to 30%, preferably 1 to 20%, to the total amount of the monomers. When its proportion exceeds 30%, the water resistance of the hardened coating film tends to be lowered.

Polymerization of these monomers in the said mixing proportion in an aqueous medium in the presence of a polymerization initiator in an inert gas atmosphere affords an emulsion containing the thermosetting resin. As the polymerization initiator, there may be exemplified usual ones such as an organic peroxide (e.g. benzoyl peroxide, t-butylperoxide, cumenehydroperoxide), an organic azo compound (e.g. azobisisobutyronitrile, azobiscyanovaleric acid, azobis-(2,4-dimethyl)valeronitrile, azobis-(2-amidinopropane)hydrochloride, an inorganic water-soluble radical initiator (e.g. potassium persulfate, ammonium persulfate, sodium persulfate, hydrogen peroxide) and a redox intiator obtained by combining the inorganic water-soluble radical initiator with sodium pyrosulfite, sodium hydrogensulfite, ferrous ion or the like. These initiators may be used solely or in combination. The amount of the polymerization initiator is 0.05 to 3%, preferably 0.1 to 3%, to the total amount of the monomers. If necessary, an appropriate amount of a conventional chain transfer agent (e.g. laurylmercaptan, hexylmercaptan) may be incorporated into the system.

Since the ampho-ionic monomer exhibits a function as an emulsifier or a dispersing agent (suspension-stabilizer), the polymerization reaction may be effected simply by admixing the monomers in water without using such agents, unlike the conventional emulsion or suspension polymerization. The following is a concrete example of the procedure for the polymerization.

In an inert gas atmosphere under normal or elevated pressure, water as the reaction medium (if necessary admixed with a hydrophilic organic solvent) which contains the polymerization initiator is kept at the polymerization temperature (usually 4° to 100° C.), and the ampho-ionic monomer or its aqueous solution (if necessary admixed with a part of or all of the active hydrogen monomer) and a mixture comprising the amide monomer (in case of being water-soluble, incorporated into the ampho-ionic monomer system) and the another polymerizable monomer, if necessary admixed with a part of or all of the active hydrogen monomer, are dropwise added thereto separately and simultaneously in 5 to 300 minutes. After the addition, the resultant mixture is aged for 5 minutes to 10 hours at the same temperature. Thus, adequate utilization of the ampho-ionic structure can afford a milky or creamy emulsion having 5 to 70% of non-volatile components in which the objective thermosetting resin is stably dispersed in the aqueous medium.

Usually, the thus obtained thermosetting resin in an emulsion form has a $\overline{M}n$ value of 10,000 to 1,000,000 and a Tg value of $-30°$ to $+80°$ C. The identification of such resin quality may be effected by a conventional procedure. For example, the $\overline{M}n$ value is determined by the gel permeation chromatography method, the osmotic method, the light-scattering method or the like. The Tg value is determined by measuring the volume thermal expansion coefficient by the aid of a dilatometer or the like.

Since the thermosetting resin having such resin can be used in an extremely wide range of pH owing to the effect of the ampho-ionic group constituting the polymer and can afford a hardened coating film having excellent water resistance and solvent resistance, it can be utilized effectively as a resin for paints.

The thermosetting paint composition of the invention comprises the said thermosetting resin as the main ingredient. More concretely, it is composed of the said thermosetting resin-containing emulsion alone or admixed with an usual aminoplast resin (e.g. melamine resin, urea resin, guanamine resin). In case of necessity, a conventional resin vehicle is incorporated, for the purpose of pigment dispersion or control of operations, in such an amount as not deteriorating the low temperature-hardening property of the thermosetting resin. There may be further incorporated organic or inorganic pigment for coloring, extender pigment, anticorrosive pigment and other additives (e.g. fillers, bulk-increasing materials, viscosity-increasing agents) and a surface active agent, a pH-regulating agent, water and a solvent in appropriate amounts. All of these components and additives are admixed and dispersed well at room temperature to obtain the objective thermosetting paint composition. For accelerating the hardening reaction, an aliphatic polycarboxylic acid (e.g. adipic acid, decanedicarboxylic acid) or an aromatic polycarboxylic acid (e.g. phthalic acid, isophthalic acid, terephthalic acid, trimellitic acid) may be incroporated into the system. When the thus prepared composition is applied to a suitable substrate to be coated (e.g. metal plates, woods, papers, plastics) by a conventional procedure to make a dry film thickness of 5 to 500 $\mu$ and then baked at 60° to 240° C. for 20 seconds to 60 minutes, an excellent hardened coating film can be obtained.

Second thermosetting resin, crosslinking agent and thermosetting paint composition:

The ampho-ionic monomer, the amide monomer and the carboxylic monomer in the second thermosetting resin may be the same as mentioned in the first thermosetting resin.

The said other polymerizable monomer may be the usual one containing ethylenic double bond. Specific examples are as follows:

(a) Hydroxyl group-containing polymerizable monomers: 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol, etc.

(b) Acrylates or methacrylates having a $C_1$-$C_{12}$ alcoholic resiudue: methyl acrylate, methyl methacrylate, n-butyl acrylate, etc.

(c) Polymerizable amides: acrylamide, methacrylamide, etc.

(d) Polymerizable nitriles: acrylonitrile, methacrylonitrile, etc.

(e) Polymerizable aromatic compounds: styrene, $\alpha$-methylstyrene, vinyltoluene, t-butylstyrene, etc.

(f) $\alpha$-Olefin compounds: ethylene, propylene, etc.

(g) Vinyl compounds: vinyl acetate, vinyl propionate, etc.

(h) Diene compounds: butadiene, isoprene, etc.

These compounds (a) to (h) may be used solely or in combination.

The thermosetting resin is composed of the amphoionic monomer, the amide monomer, the carboxylic monomer and the other polymerizable monomer. It may be prepared by solution polymerization of these monomers in a hydrophilic organic solvent by a conventional procedure for radical polymerization. The mixing proportion of these monomers may be appropriately varied depending on the properties (especially stability and viscosity) of the aqueous resin liquid obtained from the objective thermosetting resin as mentioned below and its uses. In usual, the following proportion is adopted: the ampho-ionic monomer, 0.1 to 50% (preferably 0.5 to 30%); the amide monomer, 0.5 to 70% (preferably 1 to 60%) to the total amount of the monomers; carboxylic monomer, 1 to 50% (preferably 2 to 40%); the other polymerizable monomer, 1 to 98.4%(preferably 5 to 95%). When the proportion of the amphoionic monomer is less than 0.1%, the physical properties of the coating film tend to be deteriorated. Even when it is larger than 50%, further improvement of the physical properties of the coating film is not expected, but the water resistance of the coating film is rather decreased. When the proportion of the amide monomer is less than 0.5%, the physical properties of the coating film are insufficient. When it exceeds 70%, the stability of the said aqueous resin liquid is apt to be lowered. In case of the proportion of the carboxylic monomer being less than 1%, the stability of the said aqueous resin liquid tends to be decreased. In case of the proportion exceeding 50%, the water resistance and the chemical resistance of the coating film are often lowered.

As the polymerization initiator to be used in the said solution polymerization, a conventional one may be employed. Specific examples are peroxides such as benzoyl peroxide, di-t-butylperoxide and cumenehydroperoxide and azo compounds such as azobisisobutyronitrile, 2,2'-azobis-(2,4-dimethyl)valeronitrile and 4,4'-azobis-4-cyanovaleric acid. These initiators may be used solely or in combination, usually in an amount of 0.05 to 5%, preferably 0.1 to 4%, to the total amount of the monomers. In carrying out the polymerization reaction, all amount of the intitator to be used may be admixed with the polymerizable monomers, or a part or all of its amount may be incorporated in the hydrophilic organic solvent.

There may be also used a conventional chain transfer agent such as a mercaptan (e.g. laurylmercaptan, hexylmercaptan) in an appropriate amount. The chain transfer agent may be usually admixed with the said another polymerizable monomer.

As the hydrophilic organic solvent, there may be employed a conventional one such as a $C_1$-$C_6$ alcohol, a diol (e.g. ethylene glycol, butylene glycol), a ketone (e.g. acetone, methyl ethyl ketone, methyl isobutyl ketone), an ether alcohol (e.g. ethylene glycol monoethyl ether, ethylene glycol monobutyl ether, 3-methyl-3-methoxybutanol). These solvents may be used solely or in combination.

The solution polymerization may be effected by a conventional radical polymerization procedure. For example, all of the monomers are admixed at a designed polymerization temperature (usually 40° to 250° C.) in the hydrophilic organic solvent in the presence of the polymerization initiator. Alternatively, the mixture of all of the monomers is dropwise added to the hydrophilic organic solvent previously kept at the polymerization temperature as mentioned above, and if necessary, the resultant reaction mixture is subjected to aging. The polymerization is usually in the range of 0.5 to 20 hours.

By the solution polymerization under such conditions, the objective thermosetting resin can be obtained in the form of a solution in the hydrophilic organic solvent. As to the resin quality, it is usually designed that the $\overline{Mn}$ value and the Tg value become 1,000 to 50,000 and −20 to +80° C., respectively.

On practical use, the thermosetting resin is not necessarily required to be isolated from the polymeric product obtained by the solution polymerization. Usually, the polymeric product is neutralized by a suitable basic substance (in case of the content of the carboxylic monomer in the product being 6% or more, the neutralization may be omitted) and dissolved or dispersed in water to make an appropriate concentration so as to obtain an aqueous resin liquid in the form of an aqueous solution or a colloidal aqueous resin liquid in the form of an aqueous solution or a colloidal aqueous dispersion. In stead of the neutralization treatment being effected after completion of the polymerization as mentioned above, the basic substance may be previously incorporated into the polymerization system so as to attain the neutralization.

Examples of the said basic substance are ammonia, amines such as trimethylamine, diethylamine, triethylamine, tributylamine, diethanolamine, dimethylethanolamine, diethylethanolamine, 2-amino-2-methyl-1 propanol, morpholine and pyridine, and inorganic alkaline substances such as potassium hydroxide, sodium hydroxide, lithium hydroxide and calcium hydroxide. These compounds are used solely or in combination, in an amount of 0.1 to 2 mol equivalent to the total amount of the acid in the polymerization product.

The thus obtained aqueous resin liquid may be present in an optional form from a complete aqueous solution to a colloidal aqueous dispersion, depending on the content of the hydrophilic functional group in the resin component (e.g. ampho-ionic group, carboxyl group, hydroxyl group) and especially the neutralization degree of carboxyl group and the content of the hydrophilic organic solvent. It is usually designed that the content of the non-volatile component becomes 5-85%.

The crosslinking agent of the invention comprises the said thermosetting resin as the main ingredient. More concretely, it is composed of the said aqueous resin liquid containing the thermosetting resin. When it is incorporated into an usual active hydrogen-containing resin (hereinafter referred to as "objective resin"), the resultant blended composition is given an effective bridging property and is useful as a molding material or a paint. As such an objective resin, an aqueous acryl resin, an alkyd resin, a polyester resin may be exemplified. The amount of the crosslinking agent to be used (as the resin component) is usually 5 to 200 parts (by weight), preferably 8 to 150 parts, to 100 parts of the resin component of the objective resin. When the amount is smaller than 5 parts, the crosslinking density is decreased and physical properties of a molded product or a coating film (e.g. water resistance, solvent resistance, durability) tend to be insufficient. When the amount is larger than 200 parts, the molded product or the coating film becomes often too grafile.

By admixing the said objective resin with the aqueous resin liquid in a designed proportion, if necessary together with appropriate amounts of conventional pigment, dye and other additives (e.g. filler, bulking material, viscosity-increasing agent) and a surface active agent, a pH-regulating agent, water or a hydrophilic organic solvent, a composition being useful as a molding material or a paint can be prepared. The thus prepared composition can afford, when subjected to molding or application to a substrate to be coated and subsequent baking for drying by an appropriate procedure, a hardened molded product having excellent physical properties or a hardened coating film having a high water resistance.

The thermosetting paint composition of the invention comprises the said thermosetting resin as the main ingredient. More concretely, it is composed of the said thermosetting resin-containing aqueous resin liquid alone or, if necessary admixed with a conventional resin vehicle (e.g. aminoplast resin such as melamine resin, urea resin or guanamine resin, phenoplast resin, epoxy resin). In case of necessity, conventional organic or inorganic pigment for coloring, extender pigment, anti-corrosive pigment and other additives (e.g. filler, bulking material, viscosity-increasing agent) and a surface active agent, a pH-regulating agent, water and a hydrophilic organic solvent may be further incorporated in appropriate amounts. The mixing of these components for obtaining the objective thermosetting paint composition is effected at room temperature. When the thus obtained composition is applied to a substrate to be coated to make a thickness of 5 to 500 μ by a conventional procedure and then baked for drying, a hardened coating film having an excellent surface appearance can be formed.

In the thermosetting paint composition of the invention, the ampho-ionic group of the thermosetting resin reacts effectively with the reactive amide group to cause bridging and besides accelerates the bridging reaction between the carboxyl groups or hydroxyl groups and the reactive amide group. Therefore, the baking for drying can be effected under mild conditions at a temperature of 70° to 200° C. for 30 seconds to 60 minutes, hardening conditions of high temperature and long time adopted for conventional compositions being not necessitated, and an excellent coating film having a smooth surface and showing high water resistance and solvent resistance can be obtained.

Third thermosetting paint composition:

The resin emulsion (a) to be used in the third thermosetting paint composition comprises a system obtained by polymerizing the ampho-ionic monomer, the amide monomer and the said other polymerizable monomer being copolymerizable therewith in water by a conventional procedure for radical or redox polymerization. Namely, it may be prepared under the same conditions (kinds of constituting monomers, kinds of polymerization initiators, conditions for polymerization reaction and modes of polymerization) as in the emulsion of the said first thermosetting resin.

The mixing proportion of the ampho-ionic monomer, the amide monomer and the other polymerizable monomer to be used in the preparation of the resin emulsion (a) may be appropriately varied depending on the thermosetting property of the composition and the quality of the coating film. In usual, the following proportion is adopted: the amphoionic monomer, 0.1 to 50% (preferably 0.5 to 30%) to the total amount of the monomers; the amide monomer, 0.5 to 70% (preferably 2 to 65%); the other polymerizable monomer, 50 to 99.4% (preferably 70 to 97.5%). When the amount of the ampho-ionic monomer is smaller than 0.1%, the quality of the coating film tends to be deteriorated. Even when it is larger than 50%, further improvement of the quality of the coating film is not expected, but the water resistance of the coating film is rather apt to be lowered. When the proportion of the amide monomer is less than 0.5%, physical properties of the coating film are deteriorated. When it exceeds 70%, the stability of the resin emulsion tends to be decreased.

In case of using the carboxylic monomer or the hydroxyl group-containing monomer as the another polymerizable monomer, their respective amount is desired to be 30% or less to the total amount of the monomers. With an amount larger than 30%, the water resistance and the chemical resistance of the coating film are often decreased.

The amount of the polymerization initiator to be used is usually in the range of 0.05 to 5%, preferably 0.1 to 3%, to the total amount of the monomers. There may be also employed a conventional chain transfer agent such as a mercaptan (e.g. laurylmercaptan, hexylmercaptan) in an appropriate amount.

As to the resin quality, it is usually designed that the resin emulsion (a) possesses a $\overline{Mn}$ value of 10,000 to 1,000,000 and a Tg value of $-30°$ to $+80°$ C.

The aqueous resin solution (b) comprises a system in which a polymerization product obtained by solution polymerization of the ampho-ionic monomer, the amide monomer, the carboxylic monomer and the other polymerizable monomer being copolymerizable therewith in a hydrophilic organic solvent by a conventional procedure for radical polymerization, if necessary followed by neutralization of the resultant polymeric product, is dissolved in water. Namely, it may be prepared under the same conditions as in the aqueous liquid of the said second thermosetting resin (i.e. kinds of constituting monomers, kinds and amounts of the polymerization initiator and the hydrophilic organic solvent, reaction conditions, the mode of polymerization, the neutralization treatment).

The mixing proportion of the constituting monomers to be used in the preparation of the aqueous resin solution (b) may be appropriately varied depending on the stability, the dispersibility and the thermosetting property of the composition and the quality of the coating film. In usual, the following proportion is adopted: the amphoionic monomer, 0.1 to 50% (preferably 0.5 to 30%) to the total amounts of the monomers; the amide monomer, 0.5 to 70% (preferably 2 to 65%); the carboxylic monomer, 1 to 40% (preferably 2 to 30%); the other polymerizable monomer, 10 to 98.4% (preferably 20 to 95.5%). When the proportion of the ampho-ionic monomer is less than 0.1%, the physical properties of the coating film tends to be deteriorated. Even when it exceeds 50%, further improvement of the physical properties of the coating film is not expected, but the water resistance of the coating film is often lowered. When the properties of the amide monomer is less than 0.5%, the physical properties of the coating film are insufficient. When it exceeds 70%, the stability of the aqueous resin solution is apt to be decreased. In case of the properties of the carboxylic monomer being less than 1%, the stability of the aqueous resin solution is often lowered. In case of the proportion being larger than 40%, the water resistance of the coating film tends to be decreased.

As to the resin quality, it is usually designed that the aqueous resin solution (b) has a content of nonvolatile components of 5 to 85%, a $\overline{Mn}$ value of 1,000 to 30,000 and a Tg value of $-30$ to $+80°$ C.

In the preparation of the thermosetting paint composition, it is not necessarily required to use only one kind of each of the resin emulsion (a) and the aqueous resin solution (b), but two or more kinds of each of them may be employed. The proportion of the amounts of these substances to be used is as follows: the resin emulsion, 50 to 99%, preferably 60 to 98%, as the resin component; the aqueous resin solution, 1 to 50%, preferably 2 to 40%. When the amount of the resin emulsion is smaller than 50%, the workability in coating and the durability and the water resistance of the coating film tend to be reduced. When it is larger than 99%, the pigment dispersibility of the objective composition and the smoothness and the solvent resistance of the coating film are often lowered.

The preparation of the objective thermosetting paint composition is effected by admixing the resin emulsion and the aqueous resin solution in a designed proportion, if necessary together with a conventional resin vehicle (e.g. aminoplast resin such as melamine resin, urea resin or guanamine resin, phenoplast resin, epoxy resin), a conventional organic or inorganic pigment for coloring, an extender pigment, an anti-corrosive pigment, and other additives (e.g. filler, bulking material, viscosity-increasing agent), a surface active agent, a pH-regulating agent, water and a hydrophilic organic solvent in appropriate amounts, at room temperature to make a dispersion. Alternatively, the aqueous resin solution is admixed with pigments to make a pigment paste, to which the resin emulsion, the aqueous resin solution and other additives are added to obtain the objective composition.

The thus obtained composition can afford a hardened coating film having a good surface appearance, when applied to a substrate to be coated by a conventional procedure to make a thickness of 5 to 500 $\mu$ and then subjected to baking and drying.

In the thermosetting paint composition, a high workability in coating can be attained especially by the excellent pigment dispersibility and defoaming property owing to the ampho-ionic group in the aqueous resin solution. In addition, the ampho-ionic groups in the resin emulsion and the aqueous resin solution react effectively with the reactive amide group to cause bridging and besides accelerates the condensation reaction between the carboxyl groups (and if necessary, hydroxyl groups) and the reactive amide group. Therefore, the baking and drying can be effected under mild conditions at a temperature of 70° to 250° C. for 10 seconds to 60 minutes, hardening conditions of high temperature and long time adopted for conventional compositions being not necessitated, and an excellent coating film having a smooth surface and showing high durability, water resistance and solvent resistance can be obtained.

The present invention will be hereinafter explained further in detail by the following Reference Examples, Examples of Invention and Comparative Examples, wherein parts and % are by weight. Reference Examples Nos. 1 and 2 illustrate the preparation of the ampho-ionic monomer. Reference Examples Nos. 3 to 11 illustrate the preparation of the resin emulsion. Reference Examples Nos. 12 to 20 illustrate the preparation of the aqueous resin solution. Examples Nos. 19 and 20 include an example for comparison.

REFERENCE EXAMPLE 1

In a 2 liter-volume separable flask equipped with a stirrer, a cooler and a thermometer, N,N-dimethylaminoethyl methacrylate (350 g) and acetone (800 g) are charged, and while stirring at 30° C., a solution mixture comprising 1,3-propanesultone (272 g) and acetone (100 g) is dropwise added thereto in 30 minutes. After completion of the addition, stirring is continued for further 4 hours at the same temperature, and the reaction mixture is allowed to stand at room temperature for 1 day. The precipitated white crystals are collected by filtration, washed with water and dried under reduced pressure to obtain 3-dimethyl-(methacryloylethyl)ammonium propanesulfonate (hereinafter referred to as "Compound A") (591 g; yield, 96%). M.P., 149° C. The chemical structure of this compound is as follows:

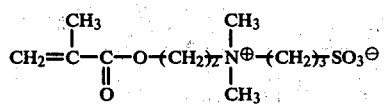

REFERENCE EXAMPLE 2

In the same flask as in Reference Example 1, N,N-dimethylaminoethyl methacrylate (628 g) and ethyl methyl ketone (400 g) are charged, and while stirring at 0° C., a solution mixture comprising β-propiolactone (288 g) and ethyl methyl ketone (300 g) is dropwise added thereto in 1 hour. After completion of the addition, stirring is continued for further 4 hours at the same temperature, and the reaction mixture is allowed to stand in a refrigerator for 1 day. The precipitated white cyrstals are collected by filtration, washed with ethyl methyl ketone and dried under reduced pressure to obtain 3-dimethyl(methacryloylethyl)ammonium ethanecarboxylate (hereinafter referred to as "Compound B") (756 g; yield, 83%). M.P., 102° C. The chemical structure of this compound is as follows:

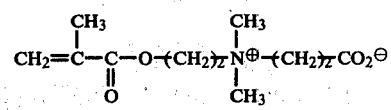

EXAMPLE 1

In a 2 liter-volume flask equipped with a stirrer, a cooler and an apparatus for temperature-control, deionized water (288 parts) is charged, and while stirring at 90° C., a solution mixture comprising azobiscyanovaleric acid (2.7 parts), dimethylethanolamine (2.5 parts) and deionized water (26.7 parts) is added thereto. Then, a solution mixture comprising Compound A obtained in Reference Example 1 (8 parts) and deionized water (120 parts) (the first solution mixture), a solution mixture comprising methyl methacrylate (103.2 parts), styrene (103.2 parts), n-butyl acrylate (137.6 parts) and N-n-butoxymethyl acrylamide (48 parts) (the second solution mixture) and a solution mixture comprising azobiscyanovaleric acid (5.3 parts), dimethylethanolamine (5.1 parts) and deionized water (53.3 parts) (the third solution mixture) are, separately and simultaneously, dropwise added thereto at the same temperature in 20 minutes. After the completion of the addition, the resultant mixture is aged at the same temperature for 1 hour to obtain a milky emulsion of thermosetting resin. Content of non-volatile components, 45%. pH, 7.8. Viscosity, 120 cps. Particle size of resin, 0.298 μ. $\overline{Mn}$ of resin particle, 30,000. Tg, 18° C.

EXAMPLES 2 to 6

The same procedure as in Example 1 is repeated but using the first and second solution mixtures having a varied composition as shown in Table 1 (parts) and the third solution mixture used in Example 1 to prepare various emulsions of thermosetting resin (Nos. 2 to 6). The properties of the thus obtained emulsions and the values of $\overline{Mn}$ and Tg of the resin particles are shown in Table 1.

Table 1

| | Composition (parts) | | | | | | | Properties | | | | | |
|---|---|---|---|---|---|---|---|---|---|---|---|---|---|
| | First solution mixture | | | | | | | | | | | | |
| | Compound A obtained in Reference | De-ionized | Second solution mixture | | | | | Non-volatile components | | Viscosity | Particle size | $\overline{Mn}$ | Tg |
| Example No. | Example 1 | water | MMA | St | n-BA | NBMAM | LM | (%) | pH | (cps) | (μ) | (×10³) | (°C.) |
| 2 | 2 | 120 | 114.6 | 114.6 | 152.8 | 16 | — | 45 | 7.6 | 10 | 0.212 | 31 | 18 |
| 3 | 2 | 120 | 105 | 105 | 140 | 48 | — | 45 | 7.4 | 15 | 0.262 | 35 | 19 |
| 4 | 4 | 120 | 104.4 | 104.4 | 139.2 | 48 | — | 45 | 7.2 | 25 | 0.202 | 38 | 18 |
| 5 | 8 | 120 | 87.6 | 87.6 | 116.8 | 100 | — | 45 | 7.2 | 28 | 0.230 | 50 | 21 |

Table 1-continued

| | Composition (parts) | | | | | | | Properties | | | | | |
|---|---|---|---|---|---|---|---|---|---|---|---|---|---|
| | First solution mixture | | | | | | | | | | | | |
| | Compound A obtained in Reference | De-ionized | Second solution mixture | | | | | Non-volatile components | | Viscosity | Particle size | $\overline{Mn}$ | Tg |
| Example No. | Example 1 | water | MMA | St | n-BA | NBMAM | LM | (%) | pH | (cps) | (μ) | ($\times 10^3$) | (°C.) |
| 6 | 4 | 120 | 104.4 | 104.4 | 139.2 | 48 | 2 | 45 | 7.3 | 20 | 0.180 | 20 | 20 |

Note:
MMA = methyl methacrylate; St = styrene; n-BA = n-butyl acrylate; NBMAM = N-n-butoxymethylacrylamide; LM = laurylmercaptan.

EXAMPLE 7

The preparation of an emulsion is effected in the same manner as in Example 1 but using Compound B (10 parts) obtained in Reference Example 2 in place of Compound A (10 parts) obtained in Reference Example 1 to obtain a milky emulsion of thermosetting resin. Content of non-volatile component, 45%. pH, 7.5. Viscosity, 15 cps. Particle size of resin, 0.210μ. This emulsion is uniform and stable like that obtained in Example 1. $\overline{Mn}$ of resin particle, 30,000. Tg, 18° C.

EXAMPLE 8

In the same reaction vessel as in Example 1, deionized water (288 parts) is charged, and while stirring at 90° C., a solution mixture comprising azobiscyanovaleric acid (2.7 parts), dimethylethanolamine (2.5 parts) and deionized water (26.7 parts) is added thereto. Then, a solution mixture comprising Compound A obtained in Reference Example 1 (8 parts), deionized water (120 parts) and N-methylolacrylamide (8.1 parts) (the first solution mixture), a solution mixture comprising methyl methacrylate (107.9 parts), styrene (107.9 parts) and n-butyl acrylate (143.8 parts) (the second solution mixture) and a solution mixture comprising azobiscyanovaleric acid (5.3 parts), dimethylethanolamine (5.1 parts) and deionized water (53.3 parts) (the third solution mixture) are, separately and simultaneously, dropwise added in 20 minutes at the same temperature. After the completion of the addition, the resultant mixture is aged at the same temperature for 1 hour to obtain a milky emulsion of thermosetting resin. Content of non-volatile component, 45%. pH, 6.4. Viscosity, 200 cps. Particle size of resin, 0.240μ. $\overline{Mn}$ of resin particle, 35,000. Tg, 22° C.

EXAMPLES 9 and 18 and COMPARATIVE EXAMPLES 1 to 2

The same procedure as in Example 1 is repeated but using the first and second solution mixtures having a varied composition as shown in Table 2 (parts) and the third solution mixture used in Example 1 to obtain various emulsions of thermosetting resin. The properties of the thus obtained emulsions and the values of $\overline{Mn}$ and Tg of the resin particles are shown in Table 2.

Table 2

| | | Composition (parts) | | | | | | | | | | |
|---|---|---|---|---|---|---|---|---|---|---|---|---|
| | | First solution mixture | | | | | Second solution mixture | | | | | |
| | | Compound A obtained in reference Example 1 | De-ionized water | NMAM | DMEA | 2-HEA | MMA | St | n-BA | NBMAM | LM | AA | 2-HEA |
| Example No. | 9 | 8 | 120 | — | 19.6 | 3.2 | 100.8 | 100.8 | 134.4 | 32 | — | 16 | 12.8 |
| | 10 | 8 | 120 | — | — | 6.9 | 103.2 | 103.2 | 137.6 | 16 | — | — | 25.6 |
| | 11 | 8 | 120 | — | — | 3.2 | 103.2 | 103.2 | 137.6 | 32 | — | — | 12.8 |
| | 12 | 8 | 120 | — | — | 3.2 | 98.4 | 98.4 | 131.2 | 48 | — | — | 12.8 |
| | 13 | 8 | 120 | — | — | 3.2 | 103.2 | 103.2 | 137.6 | 32 | 2 | — | 12.8 |
| | 14 | 8 | 120 | 21.6 | 19.6 | 3.2 | 101.4 | 101.4 | 135.2 | — | — | 16 | 12.8 |
| | 15 | 8 | 120 | 21.6 | 19.6 | 3.2 | 101.4 | 101.4 | 135.2 | — | 2 | 16 | 12.8 |
| | 16 | 8 | 120 | 21.6 | — | 3.2 | 106.3 | 106.3 | 131.8 | — | — | — | 12.8 |
| | 17 | 8 | 120 | 40 | — | 8.8 | 69.3 | 69.3 | 92.4 | — | — | — | 35.2 |
| | 18 | 8 | 120 | 20 | — | 8.8 | 89.4 | 89.4 | 119.2 | 30 | — | — | 35.2 |
| Comparative Example No. | 1 | — | 120 | — | 19.6 | 3.2 | 100.8 | 100.8 | 134.4 | 32 | — | 16 | 12.8 |
| | 2 | — | 120 | 21.6 | 19.6 | 3.2 | 103.9 | 103.9 | 138.6 | — | — | — | 12.8 |

| | | Properties | | | | | |
|---|---|---|---|---|---|---|---|
| | | Non-volatile component (%) | pH | Viscosity (cps) | Particle size (μ) | $\overline{Mn}$ ($\times 10^3$) | Tg (°C.) |
| Example No. | 9 | 45 | 6.5 | 200 | 0.173 | 25 | 22 |
| | 10 | 45 | 7.2 | 40 | 0.223 | 35 | 19 |
| | 11 | 45 | 7.3 | 50 | 0.217 | 40 | 18 |
| | 12 | 45 | 7.2 | 45 | 0.326 | 37 | 19 |
| | 13 | 45 | 7.2 | 55 | 0.208 | 14 | 20 |
| | 14 | 45 | 6.4 | 1425 | 0.180 | 30 | 24 |
| | 15 | 45 | 6.3 | 1500 | 0.170 | 16 | 23 |
| | 16 | 45 | 6.8 | 150 | 0.203 | 31 | 22 |

Table 2-continued

|  |  |  |  |  |  |  |  |
|---|---|---|---|---|---|---|---|
|  | 17 | 45 | 6.7 | 140 | 0.190 | 33 | 24 |
|  | 18 | 33 | 6.6 | 160 | 0.195 | 33 | 21 |
| Comparative Example No. | 1 | 45 | 6.8 | 15 | 0.240 | 18 | 20 |
|  | 2 | 45 | 6.5 | 30 | 0.220 | 22 | 21 |

Note:
NMAM = N-methylolacrylamide; DMEA = dimethylethanolamine; 2-HEA = 2-hydroxyethylacrylate; AA = acrylic acid.

EXAMPLE 19

The resin emulsions obtained in Examples Nos. 9, 10, 12 and 16 and Comparative Examples Nos. 1 and 2 are as such used as thermosetting paint composition. Each of them is applied to an iron plate subjected to previous treatment to make a dry film thickness of about 30μ and baked at 140° C. or 160° C. for 30 minutes to obtain a hardened coating film. The rates of dissolution in thinner and in boiling water of this film are shown in Table 3. The determination of the rate of dissolution is effected after immersion of the hardened coating film in thinner or boiling water under the following conditions:

Thinner-immersion: in generally used thinner for 1 hour.

Boiling water-immersion: in boiling water at 100° C. for 1 hour.

Table 3

| Resin emulsion |  | Baking temperature (°C.) | Rate of dissolution in thinner (%) | Rate of dissolution in boiling water (%) |
|---|---|---|---|---|
| Example No. | 9 | 140 | 0.9 | 0.3 |
|  |  | 160 | 0.4 | 0.3 |
|  | 10 | 140 | 4.5 | 0.3 |
|  |  | 160 | 0 | 0.2 |
|  | 12 | 140 | 1.6 | 0.5 |
|  |  | 160 | 0.2 | 0.1 |
|  | 16 | 140 | 0 | 1.1 |
|  |  | 160 | 0 | 0.5 |
| Comparative Example No. | 1 | 140 | 0.7 | 2.9 |
|  |  | 160 | 0 | 2.0 |
|  | 2 | 140 | 4.4 | 2.4 |
|  |  | 160 | 5.4 | 2.4 |

EXAMPLE 20

The resin emulsion obtained in Example 9 or Comparative Example 1 (93 parts) is admixed with hexamethoxymethylmelamine plast resin solution ("Saimer 303" manufactured by American Cyanamide; content of non-volatile component, 50%; solvent, ethylene glycol monobutyl ether/water=1/1 (weight ratio)) (8.4 parts) to obtain a thermosetting paint composition, which is applied to an iron plate subjected to previous treatment to make a dry film thickness of 30μ and baked at 140° C. or 160° C. for 30 minutes to obtain a hardened coating film.

EXAMPLE 21

The resin emulsion obtained in Example 9 or 11 (63 parts) is admixed with a pigment paste (32 parts) obtained by dispersing titanium oxide ("Titan R-5N" manufactured by Sakai Chemical Industry Co., Ltd.) (100 parts) in deionized water (62 parts) to obtain a thermosetting paint composition, which is applied to an iron plate subjected to previous treatment to make a dry film thickness of about 30μ and then baked at 140° C. or 160° C. for 30 minutes to obtain a hardened coating film. The rate of dissolution in thinner and in boiling water of this film and its mechanical properties are shown in Table 4.

Table 4

| Resin emulsion |  | Baking temperature (°C.) | Rate of dissolution in thinner (%) | Rate of dissolution in boiling water (%) | Mechanical properties | | | | Pencile hardness (5) |
|---|---|---|---|---|---|---|---|---|---|
|  |  |  |  |  | Bending (1) | Squares (2) | Erichsen (3) | Impact (4) |  |
| Example No. | 9 | 140 | 0 | 0 | O | 100 | 9.4$^{mm}$ | 50$^{cm}$ | H |
|  |  | 160 | 0 | 0 | O | 100 | 8.1 | 35 | H |
|  | 11 | 140 | 0 | 0 | O | 100 | 9.0 | 20 | H |
|  |  | 160 | 0.1 | 0.2 | O | 100 | 9.5 | 25 | H |

Note: (1) Judged by the change of the appearance of the coating film when the coated iron plate is bended on a round iron stick having a diameter of 2 mm as the axis, the coating film surface being in the outer side.

Criteria for judgement:

0=No change is observed.

X=Cracking on the whole surface of the coating film.

Δ=Intermediate state between 0 and X.

(2) The coating film is cut so as to make 100 squares per a unit area of 1×1 cm, and an adhesive tape is sticked thereon and then peeled off. The number of remaining squares is calculated.

(3) Determined by the aid of an Erichsen testing machine (manufactured by Tokyo Koki Co., Ltd.). The coated iron plate is fixed, and a spherical iron stick is continuously pressed against the back surface (not coated) of the plate. The degree of advance of the iron stick (mm) at the time when generation of crack on the coating film in the opposite surface is observed is recorded.

(4) DuPont method; ½ kg×½ inch. On a hole of ½ inch in diameter, the coated iron plate is placed, the coated surface being in the upside, and an iron stick of ½ inch having a spherical point is placed thereon. Then, an iron mass of ½ kg is dropped thereon from a height increasing by 5 cm, and the height (cm) before generation of crack on the coating film is recorded.

(5) The coating film is scratched by the aid of a pencil for test of pencile-scratch value (manufactured by Mitsubishi Enpitsu), and a pencile hardness being by one grade smaller than the pencile hardness which affords a scratch to a coating film is recorded.

EXAMPLE 22

In the same reaction vessel as in Example 1, ethylene glycol monoethyl ether (100 parts) is charged, and while stirring at 75° C., a solution mixture comprising styrene (43 parts), methyl methacrylate (43 parts), n-butyl acrylate (58 parts), acrylic acid (20 parts), 2-hydroxyethyl acrylate (40 parts), Compound A obtained in Reference Example 1 (2 parts) and lauryl mercaptan (8 parts) (the first solution mixture) and a solution mixture comprising styrene (44 parts), methyl methacrylate (44 parts), n-butyl acrylate (58 parts), N-n-butoxymethylacrylamide (48 parts), 2,2'-azobis-(2,4-dimethyl)valeronitrile (6 parts) and dimethylethanolamine (24.7 parts) (the second solution mixture) are, separately and simultaneously, dropwise added thereto in 2 hours. Then, a solution mixture comprising 2,2'-azobis-(2,4-dimethyl)valeronitrile (2 parts) and ethyl methyl ketone (12 parts) is dropwise added at the same temperature in 30 minutes, and stirring is continued for further 1 hour for aging.

The resultant viscous polymeric product is diluted with deionized water (688 parts) to obtain a yellow aqueous solution of thermosetting resin. Content of non-volatile component, 32.5%. Viscosity, 18,000 cps (at 30° C.). $\overline{M}n$ of resin particle, 5.500. Tg, 22° C. The determination of $\overline{M}n$ is effected by the gel permeation chromatography method. The Tg is determined by measuring the volume thermal expansion coefficient by the aid of a dilatometer.

EXAMPLE 23

The preparation of an aqueous resin solution is effected by solution polymerization and subsequent dilution with water in the same manner as in Example 22 but using a solution mixture comprising styrene (20 parts), methyl methacrylate (20 parts), n-butyl acrylate (26 parts), acrylic acid (20 parts), 2-hydroxyethyl acrylate (40 parts), Compound A obtained in Reference Example 1 (8 parts) and laurylmercaptan (8 parts) as the first solution mixture and a solution mixture comprising styrene (20 parts), methyl methacrylate (20 parts), n-butylacrylate (26 parts), N-n-butoxymethyl acrylamide (200 parts), 2,2'-azobis-(2,4-dimethyl)valeronitrile (6 parts) and dimethylethanolamine (24.7 parts) as the second solution mixture to obtain a yellow aqueous solution of thermosetting resin. Content of non-volatile component, 32.2%. Viscosity, 1,220 cps. $\overline{M}n$ of resin particle, 8,000. Tg, 34° C.

COMPARATIVE EXAMPLE 3

The solution polymerization is effected in the same manner as in Example 23 but using a solution mixture comprising styrene (22 parts), methyl methacrylate (22 parts), n-butyl acrylate (30 parts), acrylic acid (20 parts), 2-hydroxyethyl acrylate (40 parts) and laurylmercaptan (8 parts) as the first solution mixture, whereby gelation of the resin takes place 2 hours and 15 minutes after the initiation of the reaction.

EXAMPLE 24

The preparation of an aqueous resin solution is effected by solution polymerization and subsequent dilution with water in the same manner as in Example 22 but adopting a polymerization temperature of 105° C. and using a solution mixture comprising styrene (45 parts), methyl methacrylate (45 parts), n-butyl acrylate (60 parts), acrylic acid (20 parts), 2-hydroxyethyl acrylate (40 parts), Compound A obtained in Reference Example 1 (8 parts) and laurylmercaptan (8 parts) as the first solution mixture and a solution mixture comprising styrene (45 parts), methyl methacrylate (45 parts), n-butyl acrylate (60 parts), N-n-butoxymethylacrylamide (32 parts), 2,2'-azobis-(2,4-dimethyl)valeronitrile (6 parts) and dimethylethanolamine (24.7 parts) as the second solution mixture to obtain a yellow aqueous solution of thermosetting resin. Content of non-volatile component, 33.0%. Viscosity, 20,000 cps. $\overline{M}n$ of resin particle, 6,500. Tg, 22° C.

EXAMPLE 25

The preparation of an aqueous resin solution is effected by solution polymerization and subsequent dilution with water in the same manner as in Example 22 but using ethylene glycol monomethyl ether (85 parts), a solution mixture comprising acrylic acid (8 parts), 2-hydroxyethyl acrylate (40 parts), Compound A obtained in Reference Example 1 (40 parts) and ethylene glycol monomethyl ether (24 parts) as the first solution mixture, a solution mixture comprising styrene (82 parts), methyl methacrylate (82 parts), n-butyl acrylate (109 parts), N-n-butoxymethylacrylamide (40 parts), laurylmercaptan (8 parts), 2,2'-azobis-(2,4-dimethyl)-valeronitrile (6 parts) and dimethylethanolamine (9.9 parts) as the second solution mixture and deionized water (690 parts) for dilution to obtain a yellow aqueous solution of thermosetting resin. Content of non-volatile component, 33.5%. Viscosity, 2,800 cps. $\overline{M}n$ of resin particle, 6,500. Tg, 26° C.

EXAMPLES 26 to 34

The same procedure comprising solution polymerization and subsequent dilution with water as in Example 22 is repeated but using the first and second solution mixtures having a varied composition as shown in Table 5 (parts) to prepare various aqueous solutions or colloidal aqueous dispersions of thermosetting resin (Nos. 26 to 34). The properties and the resin qualities of these aqueous resin liquid are shown in Table 5.

Table 5

| Example No. | First solution mixture | | | | | | | | Second solution mixture | | | | | |
|---|---|---|---|---|---|---|---|---|---|---|---|---|---|---|
| | St | MMA | n-BA | AA | 2-HEA | A | B | LM | St | MMA | n-BA | NBMAM | ABMV | DMEA |
| 26 | 48 | 48 | 64 | 20 | 40 | 2 | — | 8 | 48 | 48 | 64 | 16 | 6 | 24.7 |
| 27 | 43 | 43 | 58 | 20 | 40 | 4 | — | 8 | 43 | 43 | 58 | 48 | 6 | 24.7 |
| 28 | 46 | 46 | 62 | 40 | 16 | 4 | — | — | 46 | 46 | 62 | 32 | 6 | 49.4 |
| 29 | 44 | 44 | 59 | 20 | 60 | 8 | — | 4 | 44 | 44 | 59 | 16 | 6 | 24.7 |
| 30 | 42 | 42 | 56 | 20 | 60 | 8 | — | 8 | 42 | 42 | 56 | 32 | 6 | 24.7 |
| 31 | 43 | 43 | 57 | 20 | 40 | 8 | — | 4 | 43 | 43 | 57 | 48 | 6 | 24.7 |
| 32 | 35 | 35 | 46 | 20 | 40 | 8 | — | 8 | 35 | 35 | 46 | 100 | 6 | 24.7 |
| 33 | 42 | 42 | 56 | 40 | 40 | 8 | — | 4 | 42 | 42 | 56 | 32 | 6 | 49.4 |

Table 5-continued

| | | | | | | | | | | | | | | |
|---|---|---|---|---|---|---|---|---|---|---|---|---|---|---|
| 34 | 43 | 43 | 57 | 20 | 40 | — | 8 | 8 | 43 | 43 | 57 | 48 | 6 | 24.7 |

| | Aqueous resin liquid | | | | |
|---|---|---|---|---|---|
| | Properties | | | | |
| | Content of non-volatile | | | Resin quality | |
| Example No. | component (%) | Viscosity (cps) | Solubility | Mn | Tg (°C.) |
| 26 | 33.4 | 600 | C | 6000 | 20 |
| 27 | 33.5 | 1400 | C | 7000 | 22 |
| 28 | 32.3 | 4900 | C | 23000 | 27 |
| 29 | 32.4 | 40000 | S | 11000 | 19 |
| 30 | 32.8 | 35000 | S | 6000 | 20 |
| 31 | 32.6 | 46000 | S | 13000 | 23 |
| 32 | 32.8 | 23000 | S | 9000 | 27 |
| 33 | 33.0 | 80000 | S | 9500 | 25 |
| 34 | 33.1 | 37000 | S | 6000 | 22 |

Note:
A = Compound A obtained in Reference Example 1.
B = Compound B obtained in Reference Example 2.
ABMVA = 2,2'-Azobis(2,4-dimethyl)valeronitrile.
Other abbreviations are as defined in Tables 1 and 2.

EXAMPLE 35

The preparation of an aqueous resin solution is effected by solution polymerization and subsequent dilution with water in the same manner as in Example 22 but using ethylene glycol monoethyl ether (200 parts), a solution mixture comprising acrylic acid (20 parts), 2-hydroxyethyl acrylate (16 parts), N-methylolacrylamide (80 parts), Compound A obtained in Reference Example 1 (4 parts), dimethylethanolamine (24.7 parts) and deionized water (50 parts) as the first solution mixture, a solution mixture comprising styrene (62 parts), n-butyl methacrylate (62 parts), n-butyl acrylate (83 parts), 2-hydroxyethyl acrylate (72 parts), 2,2'-azobis-(2,4-dimethyl)valeronitrile (6 parts) and laurylmercaptan (8 parts) as the second solution mixture and deionized water (588 parts) for dilution to obtain a yellow aqueous solution of thermosetting resin. Content of non-volatile component, 33.3%. Viscosity, 140,000 cps. $\overline{M}n$ of resin particle, 11,000. Tg, 29° C.

COMPARATIVE EXAMPLE 4

The preparation of an aqueous resin solution is effected by solution polymerization and subsequent dilution with water in the same manner as in Example 22 but using a solution mixture comprising styrene (44 parts), methyl methacrylate (44 parts), n-butyl acrylate (58 parts), acrylic acid (20 parts), 2-hydroxyethyl acrylate (40 parts) and laurylmercaptan (8 parts) as the first solution mixture and a solution mixture comprising styrene (44 parts), methyl methacrylate (44 parts), n-butyl acrylate (58 parts), N-n-butoxymethylacrylamide (48 parts), 2,2'-azobis-(2,4-dimethyl)valeronitrile (6 parts) and dimethylethanolamine (24.7 parts) as the second solution mixture to obtain a yellow aqueous solution of thermosetting resin. Content of non-volatile component, 32.3%. Viscosity, 44,000 cps. $\overline{M}n$ of resin particle, 6,500. Tg, 22° C.

EXAMPLE 36

The aqueous resin solution obtained in Example 22 (73 parts) is admixed with ethylene glycol monobutyl ether (7 parts) and deionized water (20 parts), and the mixture is stirred well by the aid of a labomixer to prepare a thermosetting paint composition.

The thus obtained paint composition is applied to a steel plate previously subjected to zinc phosphate treatment to make a dry film thickness of 30μ and baked at 140° or 160° C. for 20 minutes, whereby a transparent coating film having a smooth surface is obtained. When the thus obtained coating film is immersed into boiling water at 100° C. for 1 hour, the dissolution rate and the swelling rate are 0% and 0.6%, respectively at the baking temperature of 140° C., and 0% and 0.3%, respectively at the baking temperature of 160° C. When the coating film is immersed into a thinner widely used for paints for 1 hour, the dissolution rate is 4.4% at the baking temperature of 140° C. and 2.1% at the baking temperature of 160° C.

The dissolution rate and the swelling rate are calculated according to the following equations:

$$\text{Dissolution rate} = B - D/B - A \times 100$$

$$\text{Swelling rate} = C - D/D - A \times 100$$

wherein A is the weight of the steel plate, B is the total weight of the steel plate and the coating film, C is the total weight of the steel plate and the coating film immediately after the immersion and D is the total weight of the steel plate and the coating film after the immersion and the subsequent baking at 120° C. for 20 minutes.

EXAMPLE 37

Using the aqueous resin liquid obtained in Example 27, 30 or 31, the preparation of a paint composition and the formation of a baked coating film are effected in the same manner as in Example 36. The dissolution rate and the swelling rate of the thus obtained coating film after immersion into boiling water and its dissolution rate after immersion into a thinner are shown in Table 6.

Table 6

| Aqueous resin liquid | | Baking temperature (°C.) | Boiling water-resistance | | Thinner-resistance |
|---|---|---|---|---|---|
| | | | Dissolution rate (%) | Swelling rate (%) | Dissolution rate (%) |
| Example No. | 27 | 140 | 1.0 | 1.7 | 4.7 |
| | | 160 | 0.3 | 0.7 | 1.9 |
| | 30 | 140 | 1.0 | 0 | 4.1 |
| | | 160 | 0.2 | 0.2 | 0.6 |
| | 31 | 140 | 2.6 | 11.4 | 6.3 |

Table 6-continued

| Aqueous resin liquid | Baking temperature (°C.) | Boiling water-resistance | | Thinner-resistance |
|---|---|---|---|---|
| | | Dissolution rate (%) | Swelling rate (%) | Dissolution rate (%) |
| | 160 | 0.3 | 4.3 | 0.2 |

EXAMPLE 38

The aqueous resin liquid obtained in Example 27 (78 parts) is admixed with a white pigment ("Titon R-5N"; rutile type titanium oxide manufacturing by Sakai Chemical Industry Co., Ltd.) (260 parts), ethylene glycol monobutyl ether (30 parts) and deionized water (74 parts), and the mixture is dispersed well by the aid of a SG mill for 15 minutes to obtain a while paste of paint.

To the thus obtained white paste of paint (36 parts), the aqueous resin liquid obtained in Example 27, 32 or 33 (98 parts) is portionwise added while stirring to prepare a white paint composition.

The above obtained paint composition is applied to a steel plate previously subjected to a surface treatment to make a dry film thickness of about 40μ and then baked at 140° C. for 30 minutes for drying. The properties of the hardened coating film thus obtained are shown in Table 7.

Table 7

| Properties | Aqueous solution Example No. | | |
|---|---|---|---|
| | 27 | 32 | 33 |
| Surface of coating film | Smooth and good | Smooth and good | Smooth and good |
| Luster (determined by a gloss-meter with an angle of 60°) | 89 | 91 | 90 |
| Pencile hardness | 2H | 2H | H |
| Erichsen value (mm) | 6.7 | 7.0 | 1.1 |
| Impact strength (DuPont method, ½ kg, ½ inch) (cm) | 30 | 30 | 20 |
| Boiling water-resistance Dissolution rate (%) | 0.1 | 0 | 0.4 |
| Swelling rate (%) | 0 | 0.1 | 0 |
| Thinner-resistance Dissolution rate (%) | 0.5 | 0 | 0.1 |
| Swelling rate (%) | 11.2 | 7.8 | 8.6 |

COMPARATIVE EXAMPLE 5

In the same manner as in Example 38, a white paste of paint is prepared but using the aqueous resin solution obtained in Comparative Example 4 and adopting a pigment-dispersion time of 30 minutes, and the thus obtained paste is admixed with the said aqueous resin solution to obtain a paint composition, by the use of which a hardened coating film is formed. The properties of this coating film are as follows:

Appearance of surface of coating film: smooth and good.
Luster: 90.
Pencile hardness: H.
Erichsen value: 7.0 mm.
Impact strenth: 30 cm.
Boiling water resistance: dissolution rate, 1.2%; swelling rate, 0.6%.
Thinner resistance: dissolution rate, 2.1%; swelling rate, 27.0%.

EXAMPLE 39

The aqueous resin solution obtained in Example 23 is utilized as a crosslinking agent.

To a commecially available alkyd resin liquid ("Water Sol S-387" manufactured by Dainippon Ink and Chemicals Inc.; content of non-volatile component, 66%; solvent, ethylene glycol monobutyl ether) (206 parts), the said crosslinking agent (110 parts), the same white pigment as in Example 38 ("Titon R-5N") (100 parts), ethylene glycol monobutyl ether (45 parts) and deionized water (103 parts) are added, and the mixture is dispersed well by the aid of a SG mill for 15 minutes to obtain a white composition.

The thus obtained composition is applied to a steel plate subjected to previous treatment to make a dry film thickness of about 40μ and then baked at 140° C. for 30 minutes, whereby bridging reaction is caused effectively by the said crosslinking agent to afford an excellent coating film. The properties of this coating film are shown in Table 8.

EXAMPLES 40 and 41

In the same manner as in Example 39 but using a commercially available acryl resin liquid ("Hitaloid 7113" manufactured by Hitachi Chemical Company, Ltd.; content of non-volatile component, 50%; solvent, ethylene glycol monobutyl ether/isobutanol/water=35/15/50) (136 parts) or a commercially available alkyd resin liquid ("Water Sol E×p51W-65" manufactured by Dainippon Ink and Chemicals Inc.; content of non-volatile component, 40%; solvent, ethylene glycol monobutyl ether/water=⅓) (170 parts) as the object resin liquid for bridging, a white composition is prepared, and then a hardened coating film is formed. The properties of these coating films are shown in Table 8.

Table 8

| Properties | Example No. | | |
|---|---|---|---|
| | 39 | 40 | 41 |
| Surface of coating film | Smooth and good | Smooth and good | Smooth and good |
| Luster | 74 | 91 | 75 |
| Pencile hardness | H | 2H | 2H |
| Erichsen value (mm) | 6.0 | 4.8 | 6.9 |
| Impact strength (cm) | 20 | 20 | 30 |
| Water resistance (° C. × 500 hours) | Normal | Normal | Normal |
| Gasoline resistance (after immersion into commercially available gasoline for 20 minutes) | Normal | Normal | Normal |

REFERENCE EXAMPLE 3

In the same reaction vessel as in Example 1, deionized water (288 parts) is charged, and while stirring at 90° C. in a nitrogen gas atmosphere, a solution mixture comprising azobiscyanovaleric acid (2.7 parts), dimethylethanolamine (2.5 parts) and deionized water (26.7 parts) is added thereto. Then, a solution mixture comprising Compound A obtained in Reference Example 1 (8 parts) and deionized water (120 parts) as the first solution mixture, a solution mixture comprising methyl methacrylate (103.2 parts), styrene (103.2 parts), n-butyl acrylate (137.6 parts) and N-n-butoxymethylacrylamide (48 parts) as the second solution mixture and a solution mixture comprising azobiscyanovaleric acid (5.3 parts), dimethylethanolamine (5.1 parts) and deionized water (53.3 parts) as the third solution mixture are, separately and simultaneously, dropwise added thereto in 20 minutes at the same temperature. After completion of the addition, the resultant mixture is aged at the same temperature for 1 hour to obtain a milky resin emulsion. Content of non-volatile component, 45%. pH, 7.8. Viscosity, 120 cps. Particle size of resin, 0.298μ. $\overline{M}n$ of resin particle, 30,000. Tg, 18° C.

REFERENCE EXAMPLE 4

The preparation of a resin emulsion is effected in the same manner as in Reference Example 3 but using Compound B obtained in Reference Example 2 (10 parts) in place of Compound A obtained in Reference Example 1 (10 parts) to obtain a milky resin emulsion. Content of non-volatile component, 45%. pH, 7.5. Viscosity, 15 cps. Particle size of resin, 0.210μ. This emulsion is uniform and stable like the one obtained in Reference Example 3. The values of $\overline{M}n$ and Tg of resin particle are 30,000 and 18° C., respectively.

REFERENCE EXAMPLE 5

In the same reaction vessel as in Reference Example 3, deionized water (288 parts) is charged, and while stirring at 90° C. in a nitrogen atmosphere, a solution mixture comprising azobiscyanovaleric acid (2.7 parts), dimethylethanolamine (2.5 parts) and deionized water (26.7 parts) is added thereto. Then, a solution mixture comprising Compound A obtained in Reference Example 1 (8 parts), deionized water (120 parts) and N-methylolacrylamide (8.1 parts) as the first solution mixture, a solution mixture comprising methyl methacrylate (107.9 parts), styrene (107.9 parts) and n-butyl acrylate (143.8 parts) as the second solution mixture and a solution mixture comprising azobiscyanovaleric acid (5.3 parts), dimethylethanolamine (5.1 parts) and dieonized water (53.3 parts) as the third solution mixture are, separately and simultaneously, dropwise added thereto in 20 minutes at the same temperature. After completion of the addition, the resultant mixture is aged at the same temperature for 1 hour to obtain a milky resin emulsion. Content of non-volatile component, 45%. pH, 6.4. Viscosity, 200 cps. Particle size of resin, 0.240μ. $\overline{M}n$ of resin particle, 35,00. Tg, 22° C.

REFERENCE EXAMPLES 6 to 11 and COMPARATIVE EXAMPLE 6

The same procedure as in Reference Example 3 is repeated but using the first and second solution mixtures having a varied composition as shown in Table 9 (parts) and the same third solution mixture as in Reference Example 3 to prepare various resin emulsions. The properties of these emulsions and the values of $\overline{M}n$ and Tg of resin particle are shown in Table 9.

Table 9

| | | First solution mixture | | | | Second solution mixture | | | | | | |
|---|---|---|---|---|---|---|---|---|---|---|---|---|
| | | Compound A obtained in Reference Example 1 | Deionized water | NBMAM | DMEA | 2-HEA | MMA | St | n-BA | NBMAM | LM | AA | 2-HEA |
| Reference Example No. | 6 | 8 | 120 | — | 19.6 | 3.2 | 100.8 | 100.8 | 134.4 | 32 | — | 16 | 12.8 |
| | 7 | 8 | 120 | — | — | 3.2 | 103.2 | 103.2 | 137.6 | 32 | 2 | — | 12.8 |
| | 8 | 8 | 120 | 21.6 | 19.6 | 3.2 | 101.4 | 101.4 | 135.2 | — | — | 16 | 12.8 |
| | 9 | 8 | 120 | 21.6 | — | 3.2 | 106.3 | 106.3 | 141.8 | — | 2 | — | 12.8 |
| | 10 | 8 | 120 | 40 | — | 8.8 | 69.3 | 69.3 | 92.4 | — | — | — | 35.2 |
| | 11 | 8 | 120 | 20 | — | 8.8 | 89.4 | 89.4 | 119.2 | 30 | — | — | 35.2 |
| Comparative Example 6 | | — | 120 | — | 19.6 | 3.2 | 100.8 | 100.8 | 134.4 | 32 | — | 16 | 12.8 |

| | | Properties | | | | | |
|---|---|---|---|---|---|---|---|
| | | Non-volatile component (%) | pH | Viscosity (cps) | Particle size (μ) | $\overline{M}n$ (×10³) | Tg (°C.) |
| Reference Example No. | 6 | 45 | 6.5 | 200 | 0.173 | 25 | 22 |
| | 7 | 45 | 7.2 | 55 | 0.208 | 14 | 20 |
| | 8 | 45 | 6.4 | 1425 | 0.180 | 30 | 24 |
| | 9 | 45 | 6.8 | 150 | 0.203 | 31 | 22 |
| | 10 | 45 | 6.7 | 140 | 0.190 | 38 | 24 |
| | 11 | 33 | 6.6 | 160 | 0.195 | 33 | 21 |
| Comparative Example 6 | | 45 | 6.8 | 15 | 0.240 | 18 | 20 |

Note:
The abbreviations are as defined in Table 1, Table 2 and Table 5.

REFERENCE EXAMPLE 12

In the same reaction vessel as in Example 1, ethylene glycol monoethyl ether (100 parts) is charged, and while stirring at 75° C., a solution mixture comprising styrene (43 parts), methyl methacrylate (43 parts), n-butyl acrylate (58 parts), acrylic acid (20 parts), 2-hydroxyethyl acrylate (40 parts), Compound A obtained in Reference Example 1 (2 parts) and laurylmercaptan (8 parts) as the first solution mixture and a solution mixture comprising styrene (44 parts), methyl methacrylate (44 parts), n-butyl acrylate (58 parts), N-n-butoxymethylacrylamide (48 parts), 2,2'-azobis-(2,4-dimethyl)valeronitrile (6 parts) and dimethylethanolamine (24.7 parts) as the second solution mixture are, separately and simultaneously, dropwise added thereto in 2 hours. Then, a solution mixture comprising 2,2'-azobis-(2,4-dimethyl)-valeronitrile (2 parts) and methyl ethyl ketone (12 parts) is dropwise added thereto at the same temperature in 30 minutes, and stirring is continued for further 1 hour for aging.

The obtained viscous polymeric product is diluted with deionized water (688 parts) to prepare a yellow aqueous resin solution having 32.5% of non-volatile component and showing a viscosity of 18,000 cps (at 30° C.). $\overline{Mn}$ of resin particle, 5,500. Tg, 22° C.

volatile component and showing a viscosity of 2,800 cps. $\overline{Mn}$ of resin particle, 6,500. Tg, 26° C.

REFERENCE EXAMPLES 15 to 19

The same procedure as in Reference Example 12 comprising solution polymerization and subsequent dilution with water is repeated but using the first and second solution mixture having a varied composition as shown in Table 10 (parts) to prepare various aqueous solution of colloidal aqueous dispersion of resin (Nos. 15 to 19). The properties of these aqueous resin liquid and their resin qualities are shown in Table 10.

Table 10

| Reference Example No. | Composition (parts) | | | | | | | | | | | | |
|---|---|---|---|---|---|---|---|---|---|---|---|---|---|
| | First solution mixture | | | | | | | | Second solution mixture | | | | |
| | St | MMA | n-BA | AA | 2-HEA | A | B | LM | St | MMA | n-BA | NBMAM | ABMV | DMFA |
| 15 | 48 | 48 | 64 | 20 | 40 | 2 | — | 8 | 48 | 48 | 64 | 16 | 6 | 24.7 |
| 16 | 43 | 43 | 58 | 20 | 40 | 4 | — | 8 | 43 | 43 | 58 | 48 | 6 | 24.7 |
| 17 | 44 | 44 | 59 | 20 | 60 | 8 | — | 4 | 44 | 44 | 59 | 16 | 6 | 24.7 |
| 18 | 42 | 42 | 56 | 40 | 40 | 8 | — | 4 | 42 | 42 | 56 | 32 | 6 | 49.4 |
| 19 | 43 | 43 | 57 | 20 | 40 | — | 8 | 8 | 43 | 43 | 57 | 48 | 6 | 24.7 |

| Reference Example No. | Properties | | | | |
|---|---|---|---|---|---|
| | Non-voltile component (%) | Viscosity (cps) | solubility | $\overline{Mn}$ ($\times 10^3$) | Tg (°C.) |
| 15 | 33.4 | 600 | C | 6000 | 20 |
| 16 | 33.5 | 1400 | C | 7000 | 22 |
| 17 | 32.4 | 40000 | S | 11000 | 19 |
| 18 | 33.0 | 80000 | S | 9500 | 25 |
| 19 | 33.1 | 37000 | S | 6000 | 22 |

Note:
The abbreviations are as defined in Tables 1, 2 and 5.

REFERENCE EXAMPLE 13

The preparation of an aqueous resin solution is effected by solution polymerization and subsequent dilution with water in the same manner as in Reference Example 12 but using a solution mixture comprising styrene (20 parts), methyl methacrylate (20 parts), n-butyl acrylate (26 parts), acrylic acid (20 parts), 2-hydroxyethyl acrylate (40 parts), Compound A obtained in Reference Example 1 (8 parts) and laurylmercaptan (8 parts) as the first solution mixture and a solution mixture comprising styrene (20 parts), methyl methacrylate (20 parts), n-butyl acrylate (26 parts), N-n-butoxymethylacrylamide (200 parts), 2,2'-azobis-(2,4-dimethyl)valeronitrile (6 parts) and dimethylethanolamine (24.7 parts) as the second solution mixture to obtain a yellow aqueous resin solution having 32.2% of non-volatile component and showing a viscosity of 1,200 cps. $\overline{Mn}$ of resin particle, 8,000. Tg, 34° C.

REFERENCE EXAMPLE 14

The preparation of an aqueous resin solution is effected by solution polymerization and subsequent dilution with water in the same manner as in Reference Example 12 but using ethylene glycol monomethyl ether (85 parts), a solution mixture comprising acrylic acid (8 parts), 2-hydroxyethyl acrylate (40 parts), Compound A obtained in Reference Example 1 (40 parts) and ethylene glycol monomethyl ether (24 parts) as the first solution mixture, a solution mixture comprising styrene (82 parts), methyl methacrylate (B 82 parts), n-butyl acrylate (109 parts), N-n-butoxymethylacrylamide (40 parts), laurylmercaptan (8 parts), 2,2'-azobis-(2,4-dimethyl)valeronitrile (6 parts) and dimethylethanolamine (9.9 parts) as the second solution mixture and deionized water for dilution (690 parts) to obtain a yellow aqueous resin solution having 33.5% of non-

REFERENCE EXAMPLE 20

The preparation of an aqueous resin solution is effected by solution polymerization and subsequent dilution with water in the same manner as in Reference Example 12 but using ethylene glycol monoethyl ether (200 parts), a solution mixture comprising acrylic acid (20 parts), 2-hydroxyethyl acrylate (16 parts), N-methylolacrylamide (80 parts), Compound A obtained in Reference Example 1 (4 parts), dimethylethanolamine (24.7 parts) and deionized water (50 parts) as the first solution mixture, a solution mixture comprising styrene (62 parts), n-butyl methacrylate (62 parts), n-butyl acrylate (83 parts), 2-hydroxyethyl acrylate (72 parts), 2,2'-azobis-(2,4-dimethyl)valeronitrile (6 parts) and laurylmercaptan (8 parts) as the second solution mixture and deionized water for dilution (588 parts) to obtain a yellow aqueous resin solution having 33.3% of non-volatile component and showing a viscosity of 140,000 cps. $\overline{Mn}$ of resin particle, 11,000. Tg, 29° C.

COMPARATIVE EXAMPLE 7

The preparation of an aqueous resin solution is effected by solution polymerization and subsequent dilution with water in the same manner as in Reference Example 12 but using a solution mixture comprising styrene (44 parts), methyl methacrylate (44 parts), n-butyl acrylate (58 parts), acrylic acid (20 parts), 2-hydroxyethyl acrylate (40 parts) and laurylmercaptan (8 parts) as the first solution mixture and a solution mixture comprising styrene (44 parts), methyl methacrylate (44 parts ), n-butyl acrylate (58 parts), N-n-butoxymethylacrylamide (48 parts), 2,2'-azobis-(2,4-dimethyl)valeronitrile (6 parts) and dimethylethanolamine (24.7 parts) to obtain a yellow aqueous resin solution having 32.3% of non-volatile component and showing a viscosity of 44,000 cps. Mn of resin particle, 6,500. Tg, 22° C.

EXAMPLE 42

To the resin emulsion obtained in Reference Example 3 (333 parts), the aqueous resin solution obtained in Reference Example 12 (67.5 parts), a white pigment ("Titon R-5N") (100 parts), ethylene glycol monobutyl ether (12 parts) and deionized water (68 parts) are added, and the resultant mixture is dispersed well by a SG mill for 15 minutes to prepare a white thermosetting paint composition.

The thus obtained paint composition is applied to a steel plate subjected to previous treatment to make a dry film thickness of about 40μ and then baked at 140° C. for 30 minutes to obtain a hardened coating film. Luster, 86 (by a gloss-meter with an angle of 60°). Pencile strength, H. When the film is immersed into boiling water for 1 hour, no change is observed.

EXAMPLE 43

The preparation of a paint composition and the formation of a hardened coating film are effected in the same manner as in Example 42 but using the resin emulsion obtained in Reference Example 7 (333 parts) and the aqueous resin solution obtained in Reference Example 15 (67.5 parts). The hardened coating film thus obtained has a luster of 91 and a pencile hardness of H and undergoes no change when immersed in boiling water for 1 hour.

EXAMPLE 44

To the aqueous resin solution obtained in Reference Example 16 (79 parts), the same white pigment as in Example 42 ("Titon R-5N") (260 parts), ethylene glycol monobutyl ether (32 parts) and deionized water (72 parts) are added, and the resultant mixture is dispersed well by a SG mill for 15 minutes to prepare a white pigment paste.

The thus obtained paste (34 parts) is admixed with the resin emulsion obtained in Reference Example 6, 7 or 9 (72 parts) and stirred by a labomixer for 20 minutes to obtain a white thermosetting paint composition.

Using the thus obtained paint composition, the formation of a hardened coating film is effected as in Example 42. The properties of the obtained coating film are shown in Table II.

Table 11

| Properties | Resin emulsion | Reference Example No. | | |
|---|---|---|---|---|
| | | 6 | 7 | 9 |
| Surface of coating film | | Smooth and good | Smooth and good | Smooth and good |
| Luster | | 90 | 94 | 82 |
| Pencile hardness | | 2H | H | 2H |
| Erichsen value (mm) | | 6.0 | 7.2 | 0.9 |
| Impact strength (DuPont method, ½ kg, ½ inch) (cm) | | 25 | 35 | 20 |
| Boiling water-resistance | Dissolution rate (%) | 0 | 0 | 0 |
| | Swelling rate (%) | 1.0 | 1.1 | 2.6 |
| Thinner-resistance | Dissolution rate (%) | 0.1 | 0 | 0.9 |
| | Swelling rate (%) | 6.2 | 5.3 | 11.3 |

EXAMPLE 45

The white pigment paste obtained in Example 44 (34 parts), the aqueous resin solution obtained in Reference Example 13 (37.5 parts) and the resin emulsion obtained in Reference Example 5 (44.5 parts) are admixed and stirred well by a labomixer for 20 minutes to prepare a white thermosetting paint composition.

Using the thus obtained paint composition, a hardened coating film is formed in the same manner as in Example 42. This coating film has a luster of 89 and a pencile strength of 3H. The swelling rate after immersion into thinner is 2.1%.

COMPARATIVE EXAMPLE 8

In the same manner as in Example 44, a white pigment paste is prepared but using the aqueous resin solution obtained in Comparative Exaple 7 and adopting a dispersion time of 30 minutes, then a paint composition is prepared by using the above obtained paste and the resin emulsion obtained in Comparative Example 6, and finally a hardened coating film is formed from this paint composition. The thus obtained coating film has a luster of 92 and a pencile hardness of H. When it is immersed into boiling water for 1 hour, generation of blister is observed. After immersion into thinner for 1 hour, partial peeling takes place.

What is claimed is:

1. A thermosetting resin which is a linear copolymer having a number average molecular weight of 1,000 to 50,000 and a glass transition point of $-20°$ to $+80°$ C., obtained by polymerizing in a hydrophilic organic solvent (1) 0.5 to 30% by weight of at least one polymerizable monomer having an ampho-ionic structure, selected from the group consisting of (i) compounds representable by the formula

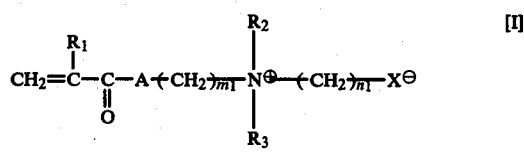

wherein $R_1$ is a hydrogen atom or a methyl group, $R_2$ and $R_3$ are each, the same or different, a $C_1$–$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by either one of the formulae:

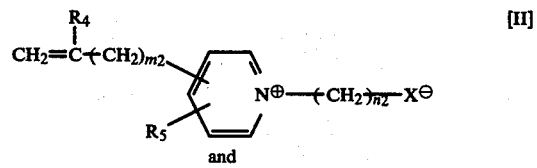

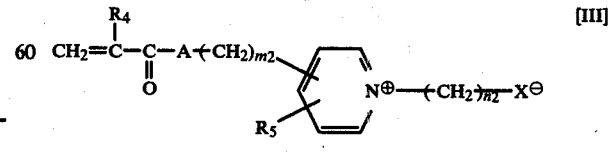

wherein $R_4$ is a hydrogen atom or a methyl group, $R_5$ is a hydrogen atom or a $C_1$–$C_3$ alkyl group, $m_2$ is an integer of 0 to 6 and $n_2$ is an integer of 1 to 6, and A and $X^\ominus$ are as defined above, (2) 1 to 60% by weight of at least one polymerizable monomer containing a reactive amide group, representable by the formula:

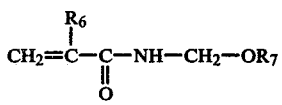

wherein $R_6$ is a hydrogen atom or a methyl group and $R_7$ is a hydrogen atom or a $C_1$-$C_4$ alkyl group and (3) 2 to 40% by weight of at least one polymerizable monomer containing a carboxyl group and (4) 5 to 95% by weight of at least one of other polymerizable monomers containing an ethylenic double bond.

2. The resin according to claim 1, wherein the polymerizable monomers containing a reactive amide group comprise N-methylolacrylamide, N-methylolmethacrylamide, N-n-butoxymethylacrylamide and N-t-butoxymethylacrylamide.

3. The resin according to claim 1, wherein the carboxyl group-containing polymerizable monomers comprise acrylic acid, methacrylic acid, crotonic acid and itaconic acid, maleic acid, fumaric acid and their monoesters.

4. The resin according to claim 1, wherein the said group of other polymerizable monomers consists of hydroxyl group-containing polymerizable monomers, acrylates or methacrylates having a $C_1$-$C_{12}$ alcoholic residue, polymerizable amides, polymerizable nitriles, polymerizable aromatic compounds, α-olefinic compounds, vinyl compounds and diene compounds.

5. A process for preparing thermostatic resins which comprises solution-polymerizing (1) 0.5 to 30% by weight of at least one polymerizable monomer having an ampho-ionic structure, selected from the group consisting of (i) compounds representable by the formula:

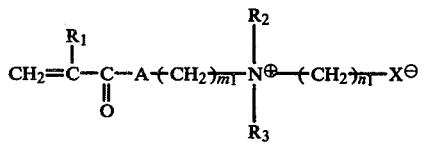

wherein $R_1$ is a hydrogen atom or a methyl group, $R_2$ and $R_3$ are each, the same or different, a $C_1$-$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by either one of the formulae:

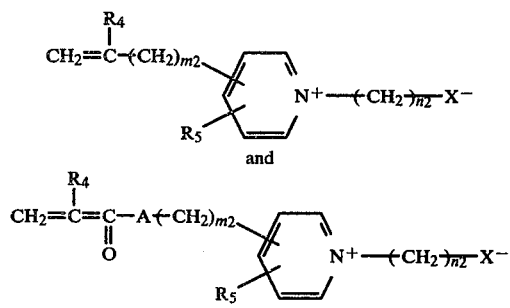

wherein $R_4$ is a hydrogen atom or a methyl group, $R_5$ is a hydrogen atom or a $C_1$-$C_3$ alkyl group, $m_2$ is an integer of 0 to 6 and $n_2$ is an integer of 1 to 6, and A and $X^\ominus$ are as defined above, (2) 1 to 60% by weight of at least one polymerizable monomer containing a reactive amide group, representable by the formula:

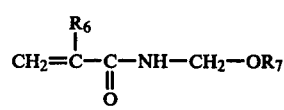

wherein $R_6$ is a hydrogen atom or a methyl group and $R_7$ is a hydrogen atom or a $C_1$-$C_4$ alkyl group and (3) 2 to 40% by weight of at least one polymerizable monomer containing a carboxyl group and (4) 5 to 95% by weight of at least one of other polymerizable monomers containing an ethylenic double bond in a hydrophilic organic solvent to obtain a linear copolymer having an average molecular weight of 1,000 to 50,000 and a glass transition point of −20° to +80° C. in the form of a solution in the hydrophilic organic solvent.

6. The process according to claim 5, wherein the polymerizable monomers containing a reactive amide group comprise N-methylolacrylamide, N-methylolmethacrylamide, N-n-butoxymethylacrylamide and N-t-butoxymethylacrylamide.

7. The process according to claim 5, wherein the carboxyl group-containing polymerizable monomers comprise acrylic acid, methacrylic acid, crotonic acid and itaconic acid, maleic acid, fumaric acid and their monoesters.

8. The process according to claim 5, wherein the said group of other polymerizable monomers consists of hydroxyl group-containing polymerizable monomers, acrylates or methacrylates having a $C_1$-$C_{12}$ alcoholic residue, polymerizable amides, polymerizable nitriles, polymerizable aromatic compounds, α-olefinic compounds, vinyl compounds and diene compounds.

9. A crosslinking agent which comprises as the main ingredient a thermosetting resin which is a linear copolymer having a number average molecular weight of 1,000 to 50,000 and a glass transition point of −20° to +80° C., obtained by solution polymerization of (1) 0.5 to 30% by weight of at least one polymerizable monomer having an ampho-ionic structure, selected from the group consisting of (i) compounds representable by the formula:

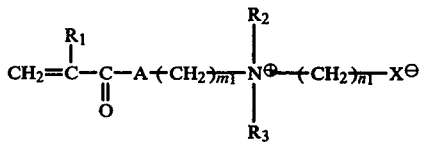

wherein $R_1$ is a hydrogen atom or a methyl group, $R_2$ and $R_3$ are each, the same or different, a $C_1$-$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by either one of the formulae:

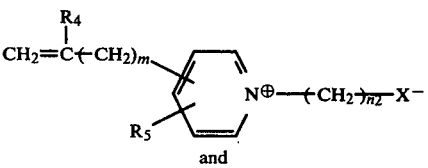

-continued

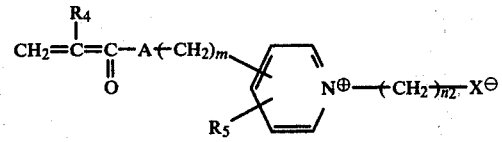

wherein $R_4$ is a hydrogen atom or a methyl group, $R_5$ is a hydrogen atom or a $C_1$–$C_3$ alkyl group, $m_2$ is an integer of 0 to 6 and $n_2$ is an integer of 1 to 6, and A and $X^\ominus$ are as defined above, (2) 1 to 60% by weight of at least one polymerizable monomer containing a reactive amide group, representable by the formula:

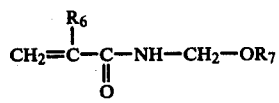

wherein $R_6$ is a hydrogen atom or a methyl group and $R_7$ is a hydrogen atom or a $C_1$–$C_4$ alkyl group and (3) 2 to 40% by weight of at least one polymerizable monomer containing a carboxyl group and (4) 5 to 95% by weight of at least one of other polymerizable monomers containing an ethylenic double bond in a hydrophilic organic solvent.

10. The crosslinking agent according to claim 9, wherein the polymerizable monomers containing a reactive amide group comprise N-methylolacrylamide, N-methylolmethacrylamide, N-n-butoxymethylacrylamide and N-n-butoxymethylacrylamide.

11. The crosslinking agent according to claim 9, wherein the carboxyl group-containing polymerizable monomers comprise acrylic acid, methacrylic acid, crotonic acid and itaconic acid, maleic acid, fumaric acid and their monoesters.

12. The crosslinking agent according to claim 9, wherein the said group of other polymerizable monomers consists of hydroxyl group-containing polymerizable monomers, acrylates or methacrylates having a $C_1$–$C_{12}$ alcoholic residue, polymerizable amides, polymerizable nitriles, polymerizable aromatic compounds, α-olefinic compounds, vinyl compounds and diene compounds.

13. A paint composition which comprises as the main ingredient a thermosetting resin which is a linear copolymer having a number average molecular weight of 1,000 to 50,000 and a glass transition point of −20° to +80° C., obtained by solution polymerization of (1) 0.5 to 30% by weight of at least one polymerizable monomer having an ampho-ionic structure, selected from the group consisting of (i) compounds representable by the formula:

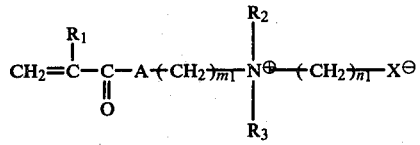

wherein $R_1$ is a hydrogen atom or a methyl group, $R_2$ and $R_3$ are each, the same or different, a $C_1$–$C_6$ alkyl group, A is O or NH, $m_1$ and $n_1$ are each, the same or different, an integer of 1 to 12 and $X^\ominus$ is $SO_3^\ominus$, $SO_4^\ominus$ or $CO_2^\ominus$ and (ii) compounds representable by weight one of the formulae:

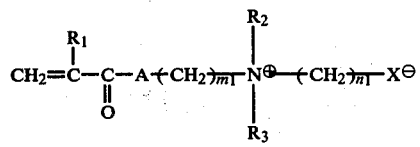

wherein $R_4$ is a hydrogen atom or a methyl group, $R_5$ is a hydrogen atom or a $C_1$–$C_3$ alkyl group, $m_2$ is an integer of 0 to 6 and $n_2$ is an integer of 1 to 6, and A and $X^\ominus$ are as defined above, (2) 1 to 60% by weight of at least one polymerizable monomer containing a reactive amide group, representable by the formula:

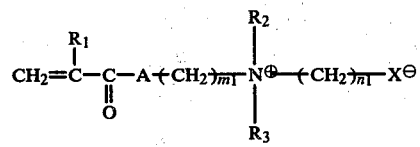

wherein $R_6$ is a hydrogen atom or a methyl group and $R_7$ is a hydrogen atom or a $C_1$–$C_4$ alkyl group and (3) 2 to 40% by weight of at least one polymerizable monomer containing a carboxyl group and (4) 5 to 95% by weight of at least one of other polymerizable monomers containing an ethylenic double bond in a hydrophilic organic solvent.

14. The composition according to claim 13, wherein the polymerizable monomers containing a reactive amide group comprise N-methylolacrylamide, N-methylolmethacrylamide, N-n-butoxymethylacrylamide and N-t-butoxymethylacrylamide.

15. The composition according to claim 13, wherein the carboxyl group-containing polymerizable monomers comprise acrylic acid, methacrylic acid, crotonic acid and itaconic acid, maleic acid, fumaric acid and their monoesters.

16. The composition according to claim 13, wherein the said group of other polymerizable monomers consists of hydroxyl group-containing polymerizable monomers, acrylates or methacrylates having a $C_1$–$C_{12}$ alcohol residue, polymerizable amides, polymerizable nitriles, polymerizable aromatic compounds, α-olefinic compounds, vinyl compounds and diene compounds.

* * * * *